United States Patent
Vivek et al.

(10) Patent No.: US 11,097,372 B2
(45) Date of Patent: Aug. 24, 2021

(54) VAPORIZING FOIL ACTUATOR CONFIGURED AS CONSUMABLE TAPE

(71) Applicant: Ohio State Innovation Foundation, Columbus, OH (US)

(72) Inventors: Anupam Vivek, Columbus, OH (US); Glenn Daehn, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 436 days.

(21) Appl. No.: 16/114,840

(22) Filed: Aug. 28, 2018

(65) Prior Publication Data

US 2019/0061045 A1 Feb. 28, 2019

Related U.S. Application Data

(60) Provisional application No. 62/551,297, filed on Aug. 29, 2017.

(51) Int. Cl.
| | |
|---|---|
| *B23K 20/08* | (2006.01) |
| *B21D 26/10* | (2006.01) |
| *B23K 35/02* | (2006.01) |
| *B23K 20/16* | (2006.01) |
| *B23K 20/06* | (2006.01) |

(Continued)

(52) U.S. Cl.
CPC .............. *B23K 20/08* (2013.01); *B21D 26/10* (2013.01); *B23K 20/06* (2013.01); *B23K 20/16* (2013.01); *B23K 35/0277* (2013.01); *B23K 35/0238* (2013.01); *B32B 15/08* (2013.01); *B32B 15/20* (2013.01); *B32B 2307/202* (2013.01); *B32B 2307/206* (2013.01)

(58) Field of Classification Search
CPC .. B23K 9/0356; B23K 35/0255; B23K 20/08; B23K 20/16; B23K 20/165; B23K 20/22; B23K 35/004
USPC .... 219/160, 549, 101, 117.1, 127, 526, 528, 219/542, 543, 59.1, 60 R, 61, 61.1, 61.2, 219/94
See application file for complete search history.

(56) References Cited

U.S. PATENT DOCUMENTS

| | | | | |
|---|---|---|---|---|
| 2,964,587 A | * | 12/1960 | Minot | H05K 3/281 174/117 A |
| 3,193,049 A | * | 7/1965 | Wollek | F16F 9/306 181/208 |

(Continued)

OTHER PUBLICATIONS

Aquasol, EZ zone tape, 2015 (Year: 2015).*

*Primary Examiner* — Christopher M Koehler
*Assistant Examiner* — Chris Q Liu
(74) *Attorney, Agent, or Firm* — Standley Law Group LLP

(57) ABSTRACT

An elongate tape (10) acts as a vaporizing actuator for impulse metalworking. It has an electrically-insulative base layer (20), an electrically-conductive layer (30), and an electrically-insulative top layer (40). In it, the base layer is characterized by the length of the tape and a first width W1, as measured between a pair of side edges. The conductive layer is characterized by the length of the tape and a second width W2, as measured between a pair of side edges; and the top layer is characterized by the length of the tape and a third width W3, as measured between a pair of side edges. The layers are joined to each other to form the elongate tape with the electrically-conductive layer interposed between the electrically-insulative base and top layers.

15 Claims, 4 Drawing Sheets

(51) Int. Cl.
*B32B 15/08* (2006.01)
*B32B 15/20* (2006.01)

(56) References Cited

U.S. PATENT DOCUMENTS

| | | | | |
|---|---|---|---|---|
| 3,365,566 A | * | 1/1968 | Kuder | B23K 9/0356 |
| | | | | 219/160 |
| 6,621,037 B2 | * | 9/2003 | Gabbianelli | B23K 11/002 |
| | | | | 219/94 |
| 9,021,845 B2 | | 5/2015 | Vivek et al. | |
| 9,121,845 B2 | * | 9/2015 | Vellutato, Jr. | G01N 33/497 |
| 2006/0068142 A1 | * | 3/2006 | Hacikyan | B23K 9/326 |
| | | | | 428/40.1 |

\* cited by examiner

VAPORIZING FOIL ACTUATOR CONFIGURED AS CONSUMABLE TAPE

CROSS-REFERENCE TO RELATED APPLICATIONS

This application is a non-provisional of, and makes a claim of priority to, U.S. provisional application 62/551,297, filed on 29 Aug. 2017. U.S. provisional application 62/551,297 is incorporated by reference as if fully recited herein.

STATEMENT REGARDING FEDERALLY-SPONSORED R & D

No federal government support was used in this invention.

TECHNICAL FIELD

The present invention is in the field of impulse metalworking. The consumable body providing the vaporizing foil actuator for effecting the vaporizing foil process is configured as a n elongate tape, so that the impulse forming process may be commercially applied.

BACKGROUND

The concepts of collision welding and impulse forming are well described in the prior published work of the inventors, such as U.S. Pat. No. 9,021,845. In such techniques, a vaporizing foil is used to accelerate at least one piece of metal to very high speed. When an obstacle is placed in its path, then because of its inertia, it would conform into or around that obstacle. Hence the sheet forms into a certain shape if the obstacle is in the form of a female die, or shears if the obstacle is a sharp edge. It is also well known that collision of a fast travelling piece of metal with another can lead to a weld, if the impact velocity and angle are in an optimum range. Collision welds are generally observed when the impact velocity is in the range of 150 m/s to 500 m/s and the impact angle is between 5 to 20 degrees, although welding can occur outside these bounds. Impulse metalworking has some distinct advantages over traditional quasi-static methods. Impulse forming leads to lower spring back, higher formability and can be implemented with single sided tooling. Impact welding has been shown to result in welds which are stronger than the parent materials. It is a solid state welding process with little or no heat affected zone because of which brittle intermetallics do not form. This process is widely used for joining dissimilar metals which are very difficult, sometimes impossible, to join by traditional fusion welding processes. The two most common agents for driving the metallic workpiece to high velocities are electromagnetic forces and explosives.

The electromagnetic launch of the workpiece is based on laws of electromagnetic induction and Lorentz forces. When a conductor, considered as secondary coil, is placed in proximity to another conductor, considered as primary coil, carrying a transient current, then a current opposing the change in magnetic field is induced in the former. These conductors carrying opposite currents repel each other and hence the workpiece gets accelerated to a high velocity. The primary coil is generally insulated from the workpiece by encapsulating it in an epoxy matrix. If the cycle times are low, the joule heat developed during the process can melt the epoxy material, leading to current shortage. There are also pressure limitations on the primary coil which depend on the mechanical strength of the epoxy as well as the coil material. Hence, the application of electromagnetic forming is limited at high energies and large numbers of operations by the availability of long-lived electromagnetic coils. Besides, the workpiece either has to be electrically conductive, or it has to be driven by a conductive flyer. Use of explosives for forming or welding has problems of its own. Their safe implementation in closed industrial settings is difficult. Also, they are mostly used for only large scale applications and there is a high expenditure on infrastructure. Besides, there are government and OSHA regulations which limit the use of explosives.

In its current state of development, vaporizing foil actuators are assembled individually to make a specific piece. It is in the long-term interest of the technology to provide the vaporizing foil actuator in a pre-assembled configuration, especially one amenable to allow implementation of the technique by robotic equipment.

SUMMARY

Some of the difficulties encountered with known electromagnetic and explosive metalworking techniques are resolved by the methods and devices as described below, particularly an elongate tape of indeterminate length, comprising a plurality of sequentially-arranged consumable bodies for use as a vaporizing foil actuator in an impulse metalworking process.

In some of the embodiments, the elongate tape has an electrically-insulative base layer, an electrically-conductive layer, and an electrically-insulative top layer. In it, the base layer is characterized by the length of the tape and a first width, as measured between a pair of side edges. The conductive layer is characterized by the length of the tape and a second width, as measured between a pair of side edges; and the top layer is characterized by the length of the tape and a third width, as measured between a pair of side edges. The layers are joined to each other to form the elongate tape with the electrically-conductive layer interposed between the electrically-insulative base and top layers.

In many of these embodiments, a portion of the electrically-conductive layer is removed, in a regular sequential manner, along the length thereof, such that at least one zone of constricted area is provided to an electrical current passing transversely from one side edge to the other. In these embodiments, the elongate tape also comprises a first and a second electrically-insulative strip, the first strip disposed between the base layer and the electrically-conductive layer and the second strip disposed between the top layer and the electrically-conductive layer, the first strip having a fourth width and the second strip having a fifth width, wherein both the fourth and fifth widths are significantly narrower than the first width. Typically, these fourth and fifth widths are each in the range of about 10% to about 15% of the first width.

In some embodiments, the first and second electrically-insulative strips comprise a non-combustible material, particularly mica or glass fiber.

In another aspect of the invention, the elongate tape comprises a further electrically-conductive layer, disposed such that the two electrically-conductive layers are between the first and second electrically-insulative strips, the further electrically-conductive layer differing from the electrically-conductive layer in that the further electrically-conductive layer has a more extensive removal of metal in a region thereof, to provide a more constricted area for flow of electrical current across the layer.

In many embodiments, at least one of the base layer or the top layer is a polymer, especially a polyimide, a polyester or a polyethylene.

In many embodiments, each electrically-conductive layer is aluminum.

Other advantages of the invention are achieved by a method for joining pieces of metal through an impulse metalworking process, comprising the steps of:

providing a plurality of sequentially-arranged consumable bodies for use as a vaporizing foil actuator in the impulse metalworking process, the plurality of consumable bodies configured as an elongate tape of indeterminate length;

feeding a leading end of the elongate tape into a welding device adapted for conducting the impulse metalworking process;

engaging the consumable body at the leading edge of the elongate tape with electrodes of the welding device;

mechanically separating the consumable body at the leading edge of the elongate tape from the remaining sequentially-arranged consumable bodies;

positioning the pieces of metal relative to the engaged consumable body; and joining the metal pieces by discharging an electrical current across a width of the engaged and mechanically-separated consumable body.

BRIEF DESCRIPTION OF THE DRAWINGS

A better understanding of the invention will be had when reference is made to the accompanying drawings, wherein identical parts are identified with identical reference numerals and wherein.

DETAILED DESCRIPTION OF THE DRAWINGS

Figure 1:
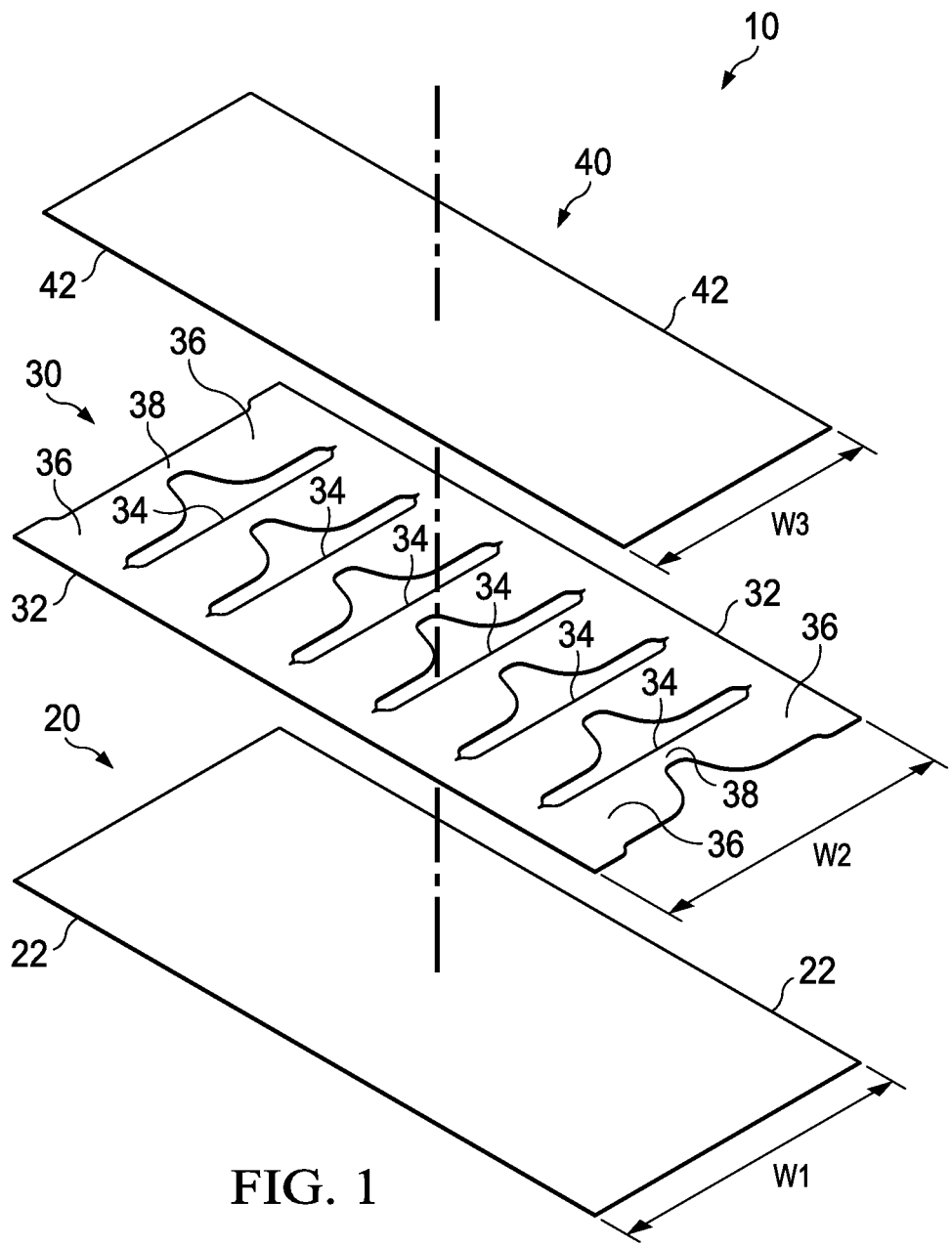
FIG. 1 is an exploded perspective view of a first embodiment of a web of vaporizing foil actuators.

A first embodiment of a continuous web or tape 10 of vaporizing foil actuator units is shown in exploded perspective view in FIG. 1. In this embodiment, the web 10 has a base layer 20 with a pair of side edges 22 separated by a predetermined width W1. The base layer 20 is intended to provide a flexible substrate upon which the web 10 is constructed. The base layer 20 is also intended to provide electrical insulation, so it will preferably be a polyimide, a polyester or a polyethylene.

A conductive layer 30 of the web 10 has a pair of side edges 32, preferably separated by a predetermined width W2 that is substantially the same as width W1 of base layer 20. This conductive layer 30 is formed from a thin strip of conductive metal that will serve as the vaporizing foil. A typical conductive metal for this service will be aluminum, although one of skill will know how to use other metals. To enhance flexibility, but also to create the pressure distribution when an individual foil actuator is vaporized, a portion of the metal in the conductive layer 30 is removed by a process such as die cutting, leaving a series of apertures 34, spaced regularly along a length of conductive layer. The apertures 34 do not extend all of the way between the side edges 32, so an area 36 is available at each side edge 32 to connect the vaporizing foil actuator to an electrical contact to pass a current across the conductive layer. This edge area 36 also maintains the conductive layer as a continuous web, so that it may be fed into a welding apparatus with a single actuator. In the embodiment of FIG. 1, the removal of metal provides a zone 38 of constricted area, to focus or concentrate the charge, facilitating a focused vaporization. The metal removal is preferably done prior to assembling the layers of the web 10. While FIG. 1 shows a single aperture 34 provided across the width dimension of the web, the presence of multiple apertures can provide more than one focused vaporization.

A top layer 40 of the web 10 has a pair of side edges 42 that are separated by a width W3 that is smaller than width W1. One advantage of doing this is to expose a portion of the conductive layer 30, namely the area 36 near the side edges 32, so that an electrical contact can be made when an individual vaporizing foil actuator is to be used. As with the base layer 20, the top layer 40 will be fabricated from an electrically insulating material. While the same selection of materials are preferred for the top layer as for the base layer, especially the electrically-insulating polymers and, most preferably, a polymer such as a polyimide, a polyester or a polyethylene. In many instances, it may be preferred to use the same material for layers 20, 40, but this is not required. It may also be preferred to use webs of material for layers 20, 40 that have the same thickness, but this is also not required.

In a typical embodiment of this web 10 of vaporizing foil actuators, the base layer 20, as the conductive layer 30 would also be preferred to be of substantially the same width, with the top layer 40 being narrower in width. While it is certainly preferred to use webs of material for layers 20, 40 that are readily-available commercially, a typical application would use a base layer 20 having a width W1 that would be nominally 4 inches and a top layer 40 with a width W3, such that the ratio W3/W1 would be in the range of from about 0.7 to about 0.85. When such a top layer 40 is centered between the edges 22 of the base layer 20 along the longitudinal axes of the webs, a portion, ranging from about 0.3 to about 0.6 inches of width of the conductive layer 30 would be exposed near the respective side edges 32. These exposed surfaces correspond essentially to areas 36 and are useful for connecting the vaporizing foil actuator unit to electrical contacts.

Figure 2:
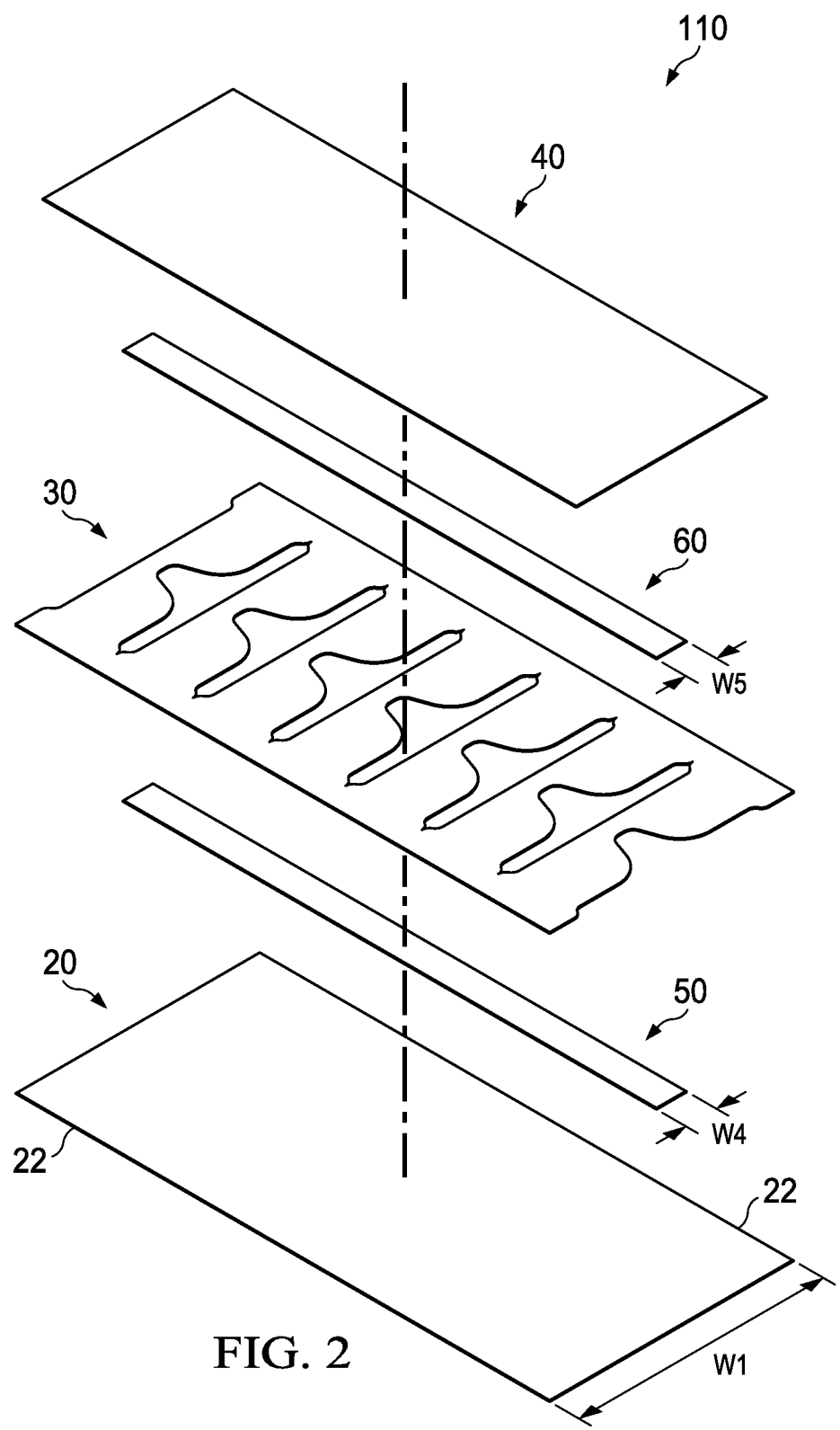
FIG. 2 is an exploded perspective view of a second embodiment of a web of vaporizing foil actuators.

A second embodiment of a continuous web or tape 110 of vaporizing foil actuators is shown in exploded perspective view in FIG. 2. In this embodiment, the web 110 has a base layer 20 with a pair of side edges 22 separated by a predetermined width W1, effectively the same as that preferred for web 10 of the first embodiment. Likewise, conductive layer 30 and top layer 40 would also be the same as in web 10.

The second embodiment 110 differs from the first embodiment 10 by the inclusion of a first and a second electrically-insulating strip 50, 60. Each of these strips 50, 60 would have a width W4, W5, respectively, that would preferably be significantly narrower than W1. In fact, in a web 110 having a nominal width W1 of 4 inches, W4 or W5 would typically be in the range of 10 to 15% of W1. In an embodiment such as web 10, the layers 20, 40 would be likely to combust when the adjacent conductive layer 30 is vaporized when exposed to the high current discharge used in the impulse forming process. The strips 50, 60, when used, would preferably be fabricated of an electrically-insulating and non-combustible material, such as mica or a glass fiber. Particular utility for this embodiment 110 is found in applications where the web 110 of vaporizing foil actuators may be fed in a connected web manner into the staging area of the impulse forming device, because maintaining a linear integrity to the web 110 allows the web to be drawn, one vaporizing foil actuator at a time, into and through the staging area. As with layers 30 and 40, strips 50 and 60 are preferably centered between the side edges 22 of base layer 20, that is, along a longitudinal axis of base layer 20. As depicted, strip 50 is between base layer 20 and conductive layer 30, while strip 60 is between conductive layer 30 and top layer 40. In some embodiments, it may be useful to use only one strip, either 50 or 60, rather than both.

Figure 3:
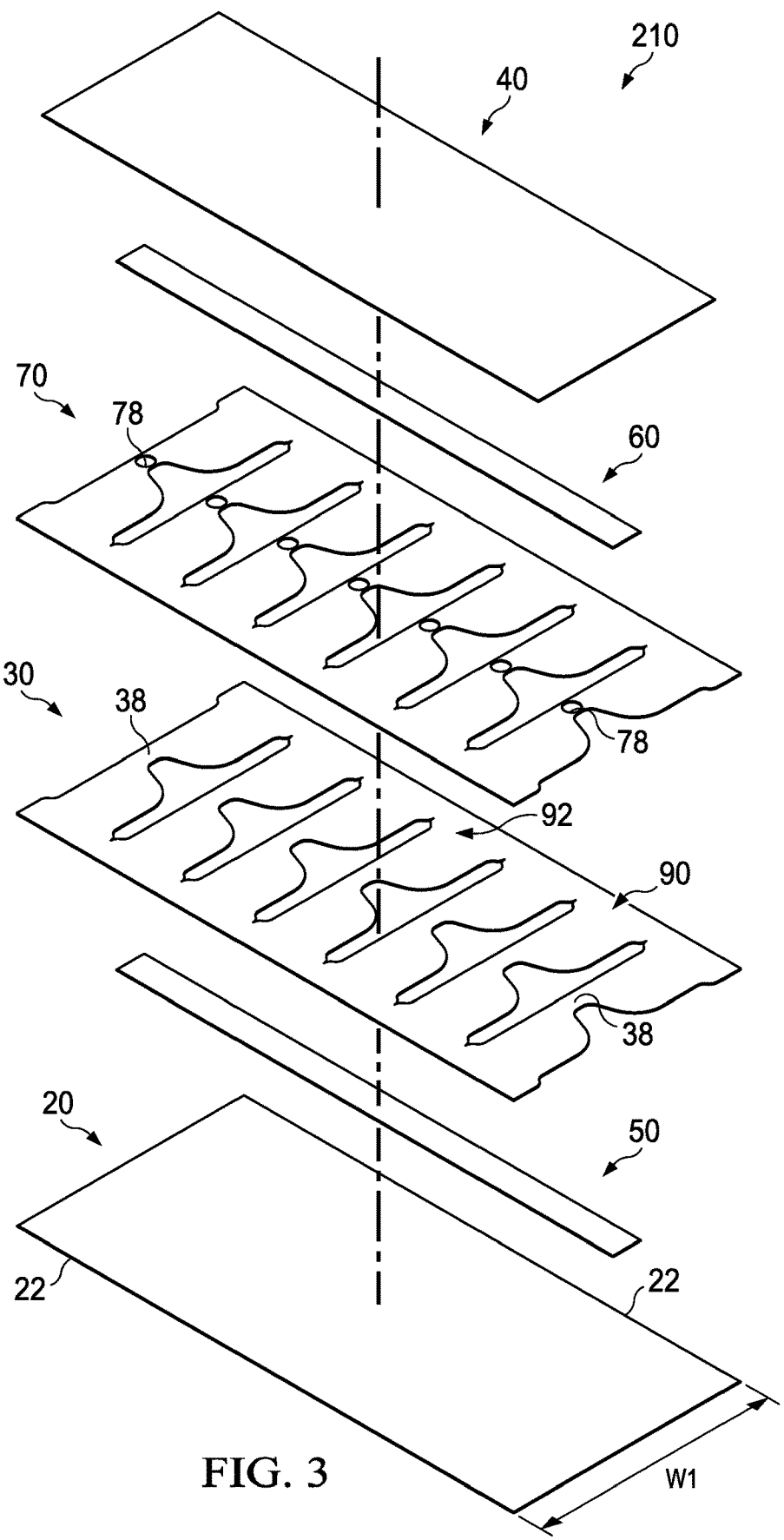
FIG. 3 is an exploded perspective view of a third embodiment of a web of vaporizing foil actuators.

A third embodiment 210 of the web of vaporizing foil actuators is presented in exploded perspective view in FIG. 3. In this embodiment, the web 210 has a base layer 20 with a pair of side edges 22 separated by a predetermined width W, effectively the same as that preferred for web 10 of the first embodiment. Likewise, conductive layer 30 and top layer 40 would also be the same as in web 10.

The primary difference in this third embodiment 210 from the first embodiment 10 is found in the inclusion of a second conductive layer 70 adjacent to conductive layer 30. While FIG. 3 shows the additional conductive layer 70 atop conductive layer 30, it could be positioned below conductive layer 30 without any expected change in performance. Second conductive layer 70, like conductive layer 30, is formed from a thin strip of conductive metal, and it will preferably be the same conductive metal and have the same dimensions as conductive layer 30. The difference between conductive layer 30 and second conductive layer 70 is a further removal of metal in the second conductive layer in the region 78 that corresponds to the zone 38 of constricted area in the conductive layer. The metal removal in region 78 can be done by punching a hole, leaving a ring of material behind or by fulling removing the constricted region of the second conductive layer 70, with a process such as die cutting being useful for this. The intention of this further metal removal is to focus the pressure of the electrical discharge, with a view to optimizing vaporization and minimizing the burning of the aluminum foil and insulating layers away from the active region.

FIG. 3 also shows the inclusion of a first and a second electrically-insulating strip 50, 60, as described above with regard to FIG. 2. Each of the insulating strips 50, 60 should be considered optional.

Mention has been made above of how the web or tape of any of the embodiments 10, 110, 210 provides a repeating sequence of vaporizing foil actuator units. One of these units 90 is best exemplified by lines A and B drawn across the conductive layer 30 in FIG. 3. When a cut is made across an assembled web 210 at both of the lines A and B, an individual vaporizing foil unit 90 is provided. The assembled web 210 can also be separated into strips 92 that each have a plurality of vaporizing foil actuator units by making cuts along lines A and C, which would provide a strip having four vaporizing foil actuator units. As the number of vaporizing foil units on an individual web 10, 110, 210 increases sufficiently, the web can be rolled on a mandrel, either with or without a core, providing a spool of the vaporizing foil actuator units. This would be a convenient method of commercial distribution.

The techniques for assembling multi-layered web products from a plurality of web layers are known in the art and the assembly for any of the webs 10, 110, 210 will be clear from FIGS. 1 to 3. In some instances, an adhesive, especially a pressure sensitive adhesive may be used, especially to join either of the polymeric insulating layers 20, 40 to an adjacent conductive layer 30 or 70. Due to their smaller width, insulating strips 50, 60, may be able to be incorporated into the assembled web product using only the adhesive used to join the wider layers on either side thereof.

Beyond adhesive, thermal joining or lamination may be useful. In particular, application of pressure and heat may allow direct joining of layers 20 and 40, through the apertures 34 in conductive layer 30 (and the equivalent aperture in the second conductive layer 70, when present. In some embodiments, the apertures 34 can be used to engage a sprocket or similar structure on one or more drive wheels.

Figure 4:
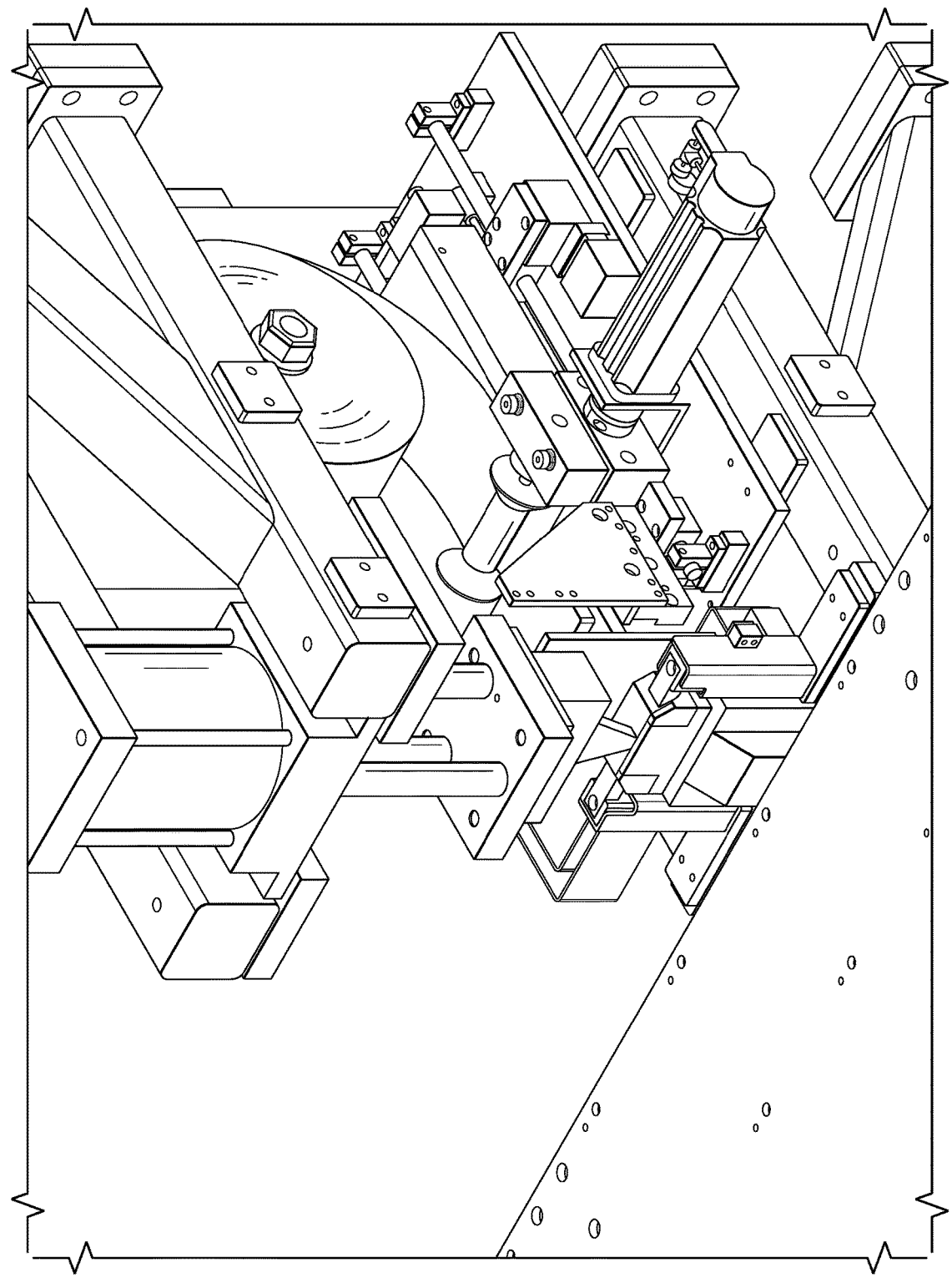
FIG. 4 is a perspective view of a web of vaporizing foil actuators being fed in the form of a spool into a pedestal welder.

Use of the products of any of these embodiments is illustrated in FIG. 4, where a pedestal welder is shown with a feed mechanism that supplies the web of vaporizing foil actuators in a sequential manner. It is a feature of this use to electrically isolate the next vaporizing foil actuator to be used from the sequentially-adjacent vaporizing foil actuator, so that the passage of current does not result in premature vaporization of the sequentially-adjacent actuators.

What is claimed is:

1. An elongate tape, used as a consumable item in an impulse metal working process, the elongate tape comprising:
   an electrically-insulative base layer;
   an electrically-conductive metal layer, and
   an electrically-insulative top layer;
   wherein the layers are joined together to form the tape, with the metal layer interposed between the base layer and the top layer;
   wherein the metal layer has a width that is larger than a width of the top layer, thereby providing a pair of electrically-conductive metal side edges along the length of the tape; and
   wherein the metal layer has, between the side edges, a portion of the metal removed, in a regular sequential manner, along the length of the elongate tape, such that an electrical current passing transversely in a portion of the tape from one side edge to the other side edge encounters a zone of constricted area to focus the current.

2. The elongate tape of claim 1, further comprising:
   a first and a second electrically-insulative strip, the first strip disposed between the base layer and the electrically-conductive layer and the second strip disposed between the top layer and the electrically-conductive layer, wherein each of the first strip and the second strip has a width that is significantly narrower than the width of the metal layer.

3. The elongate tape of claim 2, wherein:
   the widths of the first and second strips are each in the range of about 10% to about 15% of the width of the metal layer.

4. The elongate tape of claim 3, wherein each of the first and second electrically-insulative strips comprise mica or glass fiber.

5. The elongate tape of claim 3, wherein the base layer comprises a polyimide, a polyester or a polyethylene.

6. The elongate tape of claim 3, wherein the top layer comprises a polyimide, a polyester or a polyethylene.

7. The elongate tape of claim 3, wherein each electrically-conductive layer is aluminum.

8. The elongate tape of claim 2, wherein each of the first and second electrically-insulative strips comprise a non-combustible material.

9. The elongate tape of claim 8, wherein the non-combustible material comprises mica or glass fiber.

10. The elongate tape of claim 1, further comprising:
a further electrically-conductive layer, disposed such that the two electrically-conductive layers are between the first and second electrically-insulative strips, the further electrically-conductive layer differing from the electrically-conductive layer in that the further electrically-conductive layer has a more extensive removal of metal in a region thereof, to provide a more constricted area for flow of electrical current across the layer.

11. The elongate tape of claim 1, wherein the base layer is a polymer.

12. The elongate tape of claim 11, wherein the base layer is a polyimide, a polyester or a polyethylene.

13. The elongate tape of claim 1, wherein each electrically-conductive layer is aluminum.

14. The elongate tape of claim 1, wherein the top layer is a polymer.

15. The elongate tape of claim 14, wherein the top layer is a polyimide, a polyester or a polyethylene.

* * * * *